(12) United States Patent
Ishida

(10) Patent No.: US 6,739,206 B2
(45) Date of Patent: May 25, 2004

(54) LOAD DETECTION STRUCTURE FOR VEHICLE SEAT

(75) Inventor: Toshiaki Ishida, Toyko (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/412,421

(22) Filed: Apr. 14, 2003

(65) Prior Publication Data

US 2004/0003668 A1 Jan. 8, 2004

(51) Int. Cl.$^7$ ................................................ G01L 5/00
(52) U.S. Cl. ................................................ 73/862.391
(58) Field of Search .......................... 73/774, 781, 782, 73/795, 862.381, 862.391, 862.627

(56) References Cited

U.S. PATENT DOCUMENTS

| 6,161,891 A | 12/2000 | Blakesley |
| 6,288,649 B1 | 9/2001 | Wolfe |
| 6,520,023 B2 | 2/2003 | Kimura |
| 6,571,647 B1 * | 6/2003 | Aoki et al. ............ 73/862.381 |
| 6,640,653 B1 * | 11/2003 | Ishida ................... 73/862.627 |

FOREIGN PATENT DOCUMENTS

JP          11-304579 A      11/1999

* cited by examiner

*Primary Examiner*—Max Noon
(74) *Attorney, Agent, or Firm*—Browdy and Neimark

(57) ABSTRACT

A load detection structure provided between a vehicle seat and a support leg element to be fixed on a floor. The load detection structure includes a strain plate member pivotally provided within the support leg element and connected at the one end portion thereof with the vehicle seat. Such one end portion is sandwiched between two reinforcement plates, whereas another portion of the strain plate member is formed with an half hinge portion extending transversely thereof. A hinge plate having a half hinge portion is attached to that another end portion, thus defining a through-bore therein, and a hinge pin is inserted in the through-bore, so that the hinge or pivot point of the strain plate member is made small in heightwise thickness. Upper and lower stopper pieces for limiting vertical deflection of the strain plate member are formed in each of two vertical walls of the support leg element.

4 Claims, 3 Drawing Sheets

LOAD DETECTION STRUCTURE FOR VEHICLE SEAT

BACKGROUND OF INVENTION

1. Field of the Invention

The present invention relates to a structure allowing for detection of a load applied to a vehicle seat. In particular, the invention is directed to load detection structure of such a type wherein a longitudinally elongated strain plate member is provided, which extends along the fore-and-aft direction of the vehicle seat and wherein a load detection device having a strain gauge is provided under the seat such that the strain gauge detects an amount of deflection of the strain plate member which is caused by a load applied to the seat and gives a numerical data indicative of the deflection amount.

2. Description of Prior Art

Various automatically controlled functions and mechanisms have been increasingly incorporated in vehicle or automobiles, including safety devices such as air bags for protecting passengers against a great impact automatically in response to a collision. With such automated control innovations, there have been also found technical improvements to a passenger detection system for detecting the presence and absence of a passenger or driver in a seat of vehicle in advance before actuating or stopping the associated mechanical elements to automatically control various functions and mechanisms built in the seat.

Normally, the passenger detection system or a load detection structure employs sensors which can detect a load in terms of presence and absence of passenger on a seat, and recent high-tech control technology has developed sensors capable of detecting a degree of load whether the passenger is an adult or a child as with air bag control system for instance.

In such load detection structure, as disclosed from the Japanese Laid-Open Patent Publication No. 11-304579, a strain plate element and a strain gauge are employed, with such an arrangement that an amount of deflection of the strain plate element, which is caused by a load applied thereto from a seat is detected by the strain gauge. In view of the fact that the load is applied downwardly to the strain plate element which is in turn resiliently deflected, it is a normal practice to provide the strain plate element under the seat.

But, in most cases, a slide rail device is provided under the seat to allow for free forward and backward movement of the seat. Further, the abovementioned Pub. No. 11-304579 is found defective in that its link mechanism and pivoted arm are complicated in structure and further they occupy much of space heightwise between the seat and slide rail device, which results in the seat becoming large vertically in size and increasing its weight. Therefore, providing this kind of load detection structure between the slide rail device and seat will inevitably lead to an undesired increase in height of the seat. In fact, there is a strong demand among many technical peoples for a very thin structure in this particular kind of seat to avoid such increase in height of seat.

Also, the strain plate element is vulnerable to an excessive great load which is abruptly and directly applied thereto in such an emergency case as a collision or the like. That is, when applied by the excessive great load, the strain plate element is deflected to an excessive degree and may be broken. To solve the problem, there have been various conventional sorts of limit elements for limiting vertical deflection of the strain plate element. But, many of those conventional limit elements are relatively large in size because they require such a relatively massive parts as bolts, brackets and the like. This, after all, will lead to an undesirably large size of the load detection structure with many parts and complicated structure.

SUMMARY OF THE INVENTION

In view of the above-stated drawbacks, it is therefore a primary purpose of the present invention to provide an improved load detection structure arranged at a slide rail device of a vehicle seat, which is greatly simplified in structure with reduced number of constituent element and effective in avoiding undesired increase in height of the seat.

In order to accomplish such purpose, the load detection structure in accordance with the present invention includes a load detection means for detecting a load applied from an occupant on a vehicle seat and the load detection means is basically comprised of:

- a strain plate element having an elongated body extending in the longitudinal direction thereof, an upper flat surface, and a lower flat surface, the strain plate element having a rigid yet elastically deformable property and including, defined therein, a first end portion, a second end portion, an intermediate portion between the first and second end portions, and a hinge half portion formed integrally in and transversely of the second end portion, said hinge half portion thereby having a half through-bore of a semi-circular cross-section defined therein;
- a strain gauge means fixedly attached to the intermediate portion of the strain plate element;
- a first reinforcement plate fixed by at least one pin on the upper flat surface of the strain plate element at a point corresponding to the first end portion;
- a second reinforcement plate fixed by such at least one pin on the lower flat surface of strain plate element at a point corresponding to the fist end portion;
- the at least one pin being at one end thereof fixed to a bottom side of said vehicle seat;
- a hinge plate having a half hinge portion so formed therein as to have a half through-bore of a semi-circular cross-section defined therein, the hinge plate being fixed to the strain plate element at the second end portion so that the half hinge portion of the hinge plate is aligned with the half hinge portion of said strain plate element, thereby defining a hinge through-bore of circular cross-section therein;
- wherein a hinge pin is inserted in the hinge through-bore and securely provided in the support leg means, whereby the strain plate element is rotatably journalled by the hinge pin within the support leg means, and wherein, when a downward load is applied to the vehicle seat in a vertical direction, the first end portion of the strain plate element is displaced in a generally rectilinear downward direction, while at the same time, the second end portion of the strain plate element is rotated about the hinge pin, whereupon a difference is caused in movement and direction between the first and second end portion, thereby causing deflection of the intermediate portion, and, in response thereto, the strain gauge means detects an amount of the deflection and emits a corresponding value indicative of an amount of the load.

Accordingly, the hinge portion in which the strain plate element is rotated is effectively made small heightwise in thickness within the support leg means without requiring another thick support elements. Thus, the load detection structure can be kept thin in heightwise, thereby avoiding undesired increase in height of the seat.

In one aspect of the present invention, a stopper means is provided for limiting vertical movement of the first end portion of stain plate element and the stopper means comprises an upper stopper piece and a lower stopper piece, wherein the upper and lower stopper pieces are formed in each of a pair of vertical walls of the support leg means by cutting and bending a corresponding local area of each of those two vertical walls in a direction inwardly of the support leg means. The first end portion of strain plate element is normally positioned between the upper and lower stopper pieces, such that one limited clearance is given between the upper stopper piece and the first end portion, while another limited clearance is given between the lower stopper piece and the first end portion.

Other features and advantages will become apparent from reading of descriptions hereinafter, with reference to the annexed drawings.

DETAILED DESCRIPTION OF PREFERRED EMBODIMENT OF THE INVENTION

Figure 1:
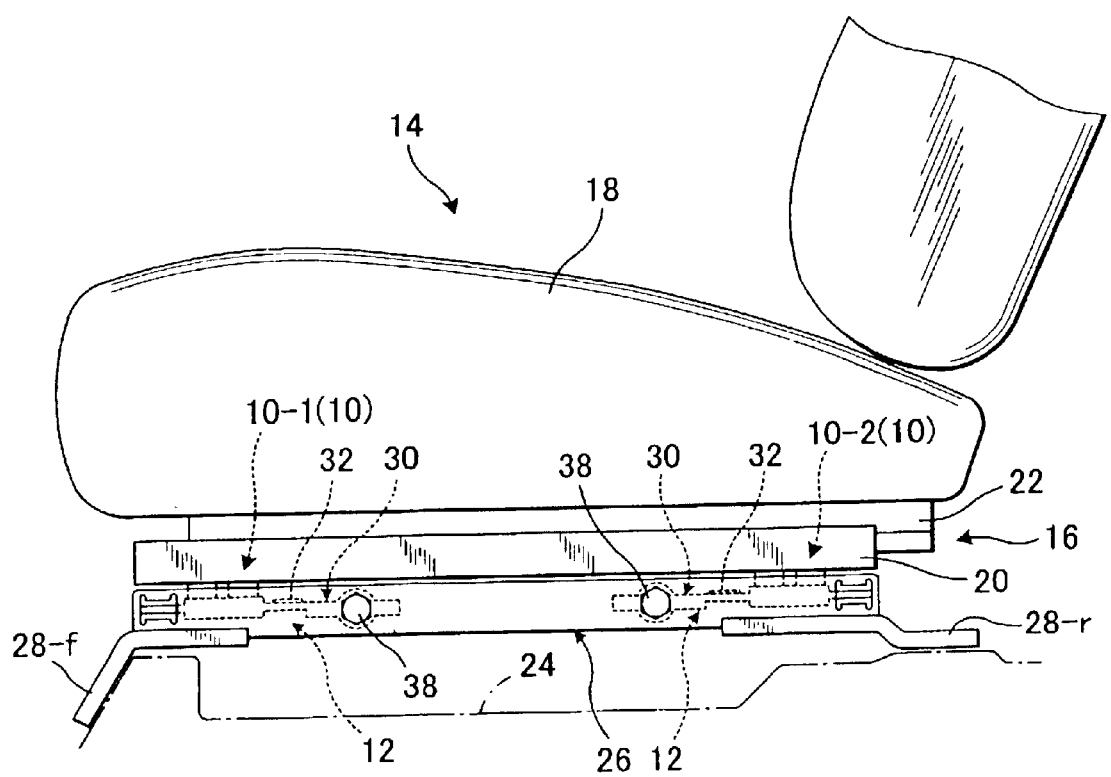
FIG. 1 is a partly broken elevational side view of a vehicle seat in which a load detection structure of the present invention is provided.

Referring to FIGS. 1 through 4, there is illustrated one preferred mode of load detection structure applicable to a vehicle seat in accordance with the present invention. Reference is first made to FIG. 1 in which designation (10) generally represents a load detection structure provided between a slide rail device (16) and a support leg member (26) in a novel simplified manner.

As is known, the slide rail device (16) comprises a stationary lower rail (20) to be fixed on a floor (24) of a vehicle (not shown) and a movable upper rail (22) slidably fitted in and along the lower rail (20). The typical configuration of such slide rail device (16) is shown in the figures, wherein the movable upper rail (22) has generally inverted-T-shaped base portion slidably accommodated within the lower rail (20) via steel balls and rollers (not shown). As seen from FIG. 1, the upper rail (22) is fixedly attached to a seat cushion (18) of a vehicle seat (14) whereas the lower rail (20) is securely and operatively attached via the load detection structure (10) upon the support leg member (26). Support leg member (26) has a forward securing leg portion (28-$f$) and a backward securing leg portion (28-$r$). As shown, those two securing leg portions (28-$f$) (28-$r$) are firmly fastened to a floor (24) of vehicle.

Though not shown clearly, in fact, both slide rail device (16) and support leg member (26) are each provided in pair. Namely, a pair of slide rail devices (16) are provided under the bottom of seat cushion (18) and a pair of support leg members (26) are provided for supportively receiving those two slide rail devices (20) thereon, respectively. Of course, the load detection structure (10), a principal part of the present invention, is interposed between each slide rail device (16) and each support leg member (26), and therefore, a pair of load detection structures (10) are arranged under the seat (14).

According to the embodiment shown in FIG. 1, the load detection structure (10) is divided into forward and rearward load detection structures (10-1) (10-2) which are respectively disposed in the forward and rearward regions of a mutually mated pair of lower rail (20) and support leg member (26). Therefore, as far as the present embodiment is concerned, while not shown, it follows that a pair of forward load detection structures (10-1) are so arranged forwardly of the seat (14) that they are respectively disposed in the forward regions of left-side mated pair of lower rail (20) and support leg member (26) and in the forward regions of right-side mated pair of lower rail (20) and support leg member (26), whereas a pair of rearward load detection structures (10-2) are so arranged rearwardly of the seat (14) that they are respectively disposed in the rearward regions of right-side mated pair of lower rail (26) and support leg member (28) and in the rearward regions of left-side mated pair of lower rail (26) and support leg member (28). Since all the load detection structures (10-1) (10-2), the pair of slide rail devices (16) and the pair of support leg members (26) are identical in structure to one another, description will be made only of one forward load detection structure (10-1) in one of the two slide rail devices (16) and one of the two support leg members (26), for the sake of simplicity.

The load detection structure (10) includes a load detection means (12) workable to detect an amount of a load (F) applied vertically from an occupant on the seat (14).

In accordance with the present invention, the load detection means (12) comprises: a strain plate member (30), a pair of reinforcing plates (34-1) (34-2), a hinge plate (42), and a strain gauge (32). The strain plate member (30) has, defined herein, a first end portion (30$b$), a second end portion (30$c$) and an intermediate portion (30$a$) defined between the first and second end portions (30$a$) (30$c$). The strain gauge (32) is adapted for detecting a deflection of the stain plate member (30) which is caused by a difference in movement and direction between the first end portion (30$b$) and the second end portion (30$c$), as will be described later.

Basically, in brief, the load detection means (12) is rotatably connected with the support leg member (26) at a given pivot point in the second end portion (30$c$) thereof, while being connected at the first end portion (30$b$) thereof between the slide rail device (16) and support leg member (26), so that the intermediate portion (30$a$) is deflectable in the vertical direction relative to the second end portion (30$c$) as will be elaborated later.

As shown, the strain gauge (32) is attached tight (via an adhesive for example) on the upper side of the intermediate portion (30$a$) of strain plate member (30) for detecting an amount of strain or deflection mentioned above, which is caused in the strain plate member (30). While note shown, the strain gauge (32) is of a known type comprising an electrical insulating thin plate and a metallic resistance wire embedded sinuously in that thin plate. Of course, the electrical insulating thin plate is of an elastic property and may be resiliently deformable. The strain gauge (32) is not imitative, but may be formed in any otherwise manner insofar as it can detect the deflection of strain plate member (30).

Figure 4:
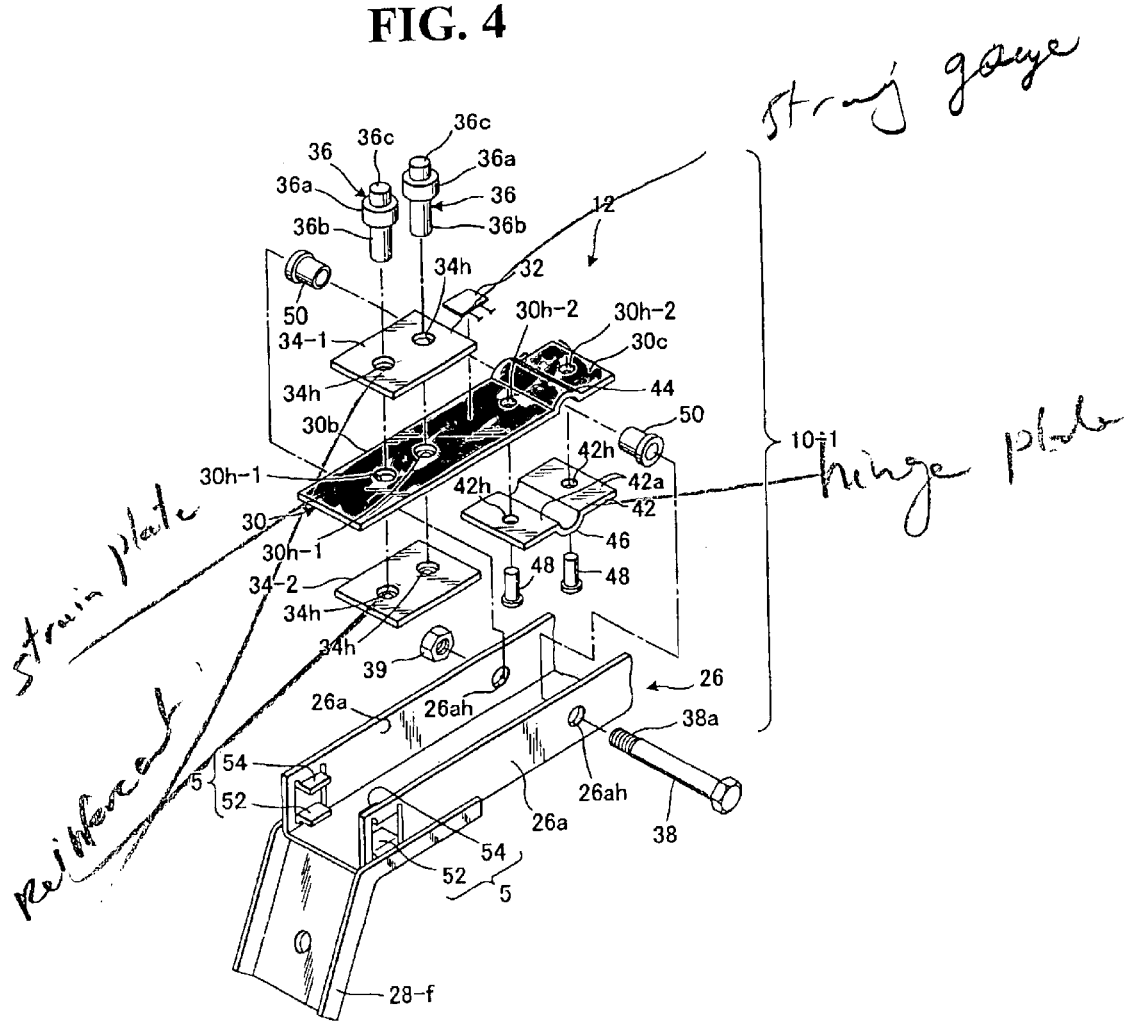
FIG. 4 is a partly broken, exploded perspective view of the principal part of the load detection structure.

In accordance with the present invention, the strain plate member (30) per se is generally of a longitudinally extending plate-like configuration which elongates its relatively thin body lengthwise as best seen from FIG. 4. Also, it is formed from a rigid yet resiliently deformable material having a property that tends to recover into its original shape even when subjected to deformation by a great external load applied thereto. For that purpose, preferably, the strain plate member (30) may be formed from a spring steel material. As will become understood later, the intermediate portion (30a) is a point for providing a vertical resilient bendability of the strain plate member (30) relative to a pivot point which will be described later.

It is noted that the strain gauge (32) may be fixedly attached on the lower side of the intermediate portion (30a) by means of adhesive or the like.

As best shown in FIG. 4, the strain plate member (30) has a pair of first spaced-apart holes (30h-1) (30h-1) are formed in the first end portion (30a) thereof and a hinge half portion (44) of generally inverted-U-shaped semi-circular cross-section in the second end portion (30c) thereof. In other words, such hinge half portion (44) project upwardly from the upper flat surface of the strain plate member (30). Further, in this strain plate member (30), a pair of second holes (30h-2) (30h-2) are formed in the second end portion (30c) in a symmetrical manner relative to the hinge half portion (44).

A hinge plate (42) is shown in FIG. 4 to be formed with a hinge half portion (46) of generally U-shaped semi-circular cross-section and a pair of horizontal portions (42a) (42a) extending from the hinge half portion (46) outwardly. A pair of holes (42h) (42h) are formed in those two horizontal portions (42a), respectively. The hinge plate (42) is firmly fixed to the reverse or lower flat surface of strain plate member (30) at a point corresponding to the second end portion (30c) by inserting two rivet pins (48) (48) through one pair of aligned holes (42h) (30h-2) and another pair of aligned holes (42h) (30h-2), respectively, and riveted as at the corresponding two designations (48a) (48a) in FIG. 2, so that the hinge half portion (44) is completely aligned with the hinge portion (46), thereby defining a through-bore (at 40 in FIG. 2) which extends in and along the two mated hinge half portions (44) (46) in a direction transversely of the strain plate member (30).

Of course, in contrast to the above-described structure, a hinge half portion of generally inverted-U-shaped semi-circular cross-section may be formed in the second end portion (30c) of strain plate member (30), in which case, the hinge half portion projects downwardly from the lower flat surface of strain plate member (30) and the hinge plate (42) may be fixed to the upper surface of strain plate member (30) at a point corresponding to that second end portion (30c) by means of the two rivet pins (48), though not shown, thereby defining a through-bore (at 40) which extends in and along the two mated hinge half portions in a direction transversely of the train plate member (30).

Designations (34-1) (34-2) represent a pair of first and second reinforcement plates, respectively. As shown in FIG. 4, each of the first and second reinforcement plates (34-1) (34-2) is formed with a pair of spaced-apart holes (34h) (34h) therein.

Designations (36) (36) denote a pair of securing pins (rivet-type pins), respectively. As shown, each securing rivet pin (36) is so formed to have a first shank portion (36c), a second shank portion (36b), and a large-diameter shank portion (36a) defined between the first and second shank portions (36c) (36b), wherein both two free ends respectively of the first and second shank portion (36b) can be riveted.

It is noted that the foregoing paired holes (34h) (34h) respectively associated with the first and second reinforcing plates (34-1) (34-2) are equal in diameter to and in aligned relation with the respective two holes (30h-1) of strain plate member (30), and that the large-diameter shank portion (36a) of each of the two securing pins (36) is larger in diameter than those holes (34h) (30h-1).

Figure 2:
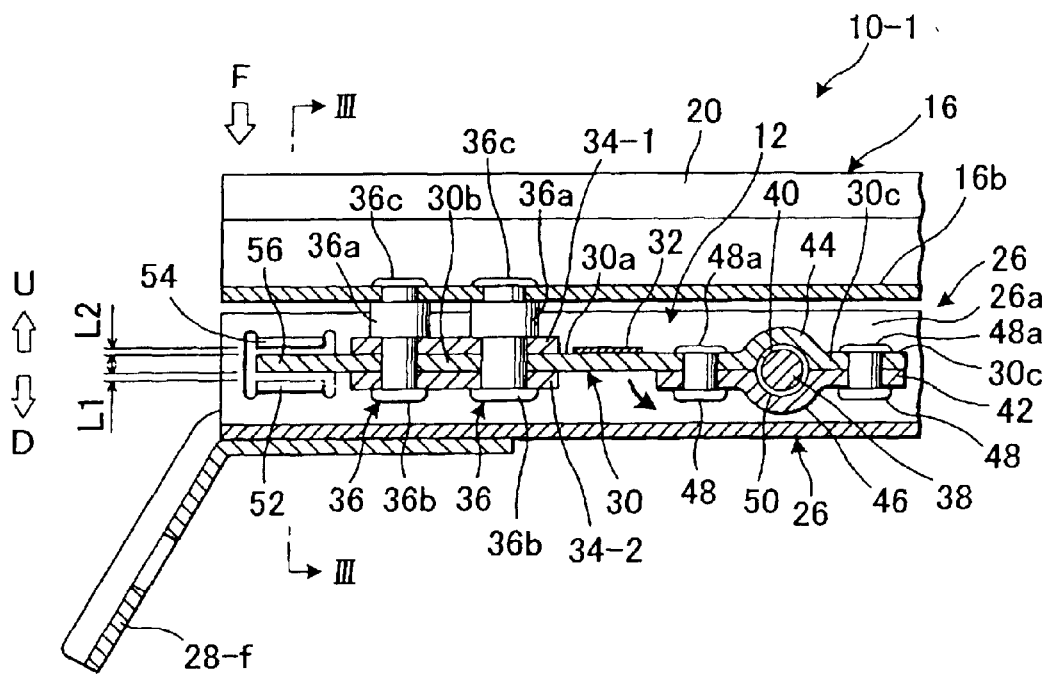
FIG. 2 is a partly broken sectional view showing a principal part of the load detection structure.
Figure 3:
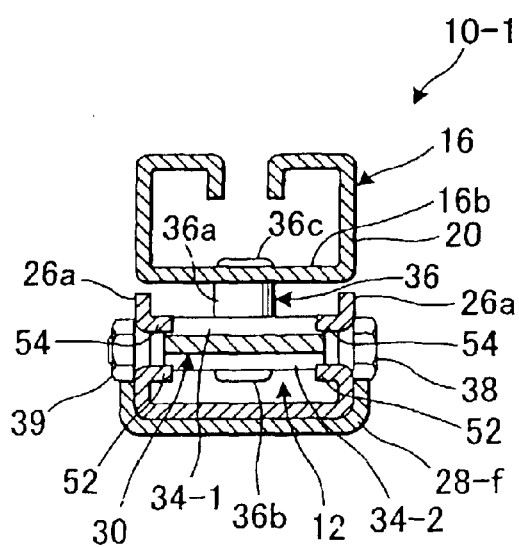
FIG. 3 is a sectional view taken along the line III—III in the FIG. 2.

As indicated in FIG. 4 and understandable from FIG. 2, the first end portion (30b) of the strain plate member (30) is sandwiched between the first and second reinforcement plates (34-1) (34-2) so that all the holes (34h, 30h-1) are aligned with one another, and then, by inserting each securing pin second shank portion (36b) through the corresponding aligned three holes (34h) (30h-1) (34) and riveting the free end of second shank portion (36b), both first and second reinforcement plates (34-1) (34-2) are firmly fastened by the two securing pins (36) to the strain plate member (30).

In that way, the illustrated mode of load detection means (12) is assembled.

On the other hand, the support leg member (26) is shown to be of a generally U-shaped configuration in cross-section having a pair of vertical walls (26a) (26a). Formed respectively in such two vertical walls (26a) are a pair of mutually facing stopper means (5) (5) for limiting a vertical excessive deflection of the strain plate member (30). Also, formed respectively in the two vertical walls (26a) are a pair of mutually facing bearing holes (26ah) (26ah). More specifically, in the illustrated embodiment, the stopper means (5) is defined at a point in the vicinity of the forward end of the support leg member (26) and embodied by a pair of spaced-apart upper and lower stopper pieces (54) (52) extending horizontally from the vertical wall (26a) in a parallel with each other. The two stopper pieces (54) (52) are formed by cutting and bending the corresponding local region of the vertical wall (26a) so as to project from the vertical surface of the vertical wall (26a) by a right angle in a direction inwardly of the support leg member (26).

Mounting the foregoing load detection means (12) in that support leg member (26) is based on the steps of: firstly disposing the free end of the first end portion (30b) of strain plate member (30) between the two stopper pieces (54) (52); then, inserting a hinge pin (38) through the right-side hole (26ah) via an oilless bush (50), the through-bore (40) defined between the two hinge half portions (44) (46) and the left-side hole (26ah) via an oilless bush (50), as viewed and understandable from FIGS. 2 and 4; and finally, threadedly engaging the nut (39) with the threaded end portion (38a) of the hinge pin (38).

Next, as understandable from FIG. 2, the two securing pin first shank portions (36c) are respectively inserted through two holes formed in the bottom wall (16b) of the lower rail (16) and riveted there, thereby firmly connecting the first end portion (30b) of strain plate member (30) with the lower rail (16).

As indicated in FIG. 2, it is important to note that the free end of the strain plate member (30) is positioned between the upper and lower stopper pieces (54) (52) and normally out of contact therewith. Namely, under such normal state, an upper limited clearance (L2) is given between the strain plate member (30) and the upper stopper piece (54), while a lower limited clearance (L1) is given between the strain plate member (30) and the lower stopper piece (52).

Since the strain plate member (30) is juxtaposed with the two reinforcement plates (34-1) (34-3) at the first end portion (30b) thereof and also juxtaposed with the hinge plate (42) at the second end portion (30c) thereof, it is to be appreciated that, when applied by a downward load from the seat (14), both the first and second end portions (30b) (30c) are protected against deflection and breakage, but, by contrast, the intermediate portion (30a), on which the strain gauge (32) is mounted, is resiliently deflectable in the vertical direction.

With the above-described construction, it can be seen from FIGS. 1 and 2 that, when a vertical load or a weight of an occupant on the seat (14), as designated by (F), is applied to the slide rail device (16), the corresponding downward force is directly imparted to the first end portion (30b) of strain plate member (30), thus causing downward displacement of that particular end portion (30b) as indicated by the downward arrow (D) and, concurrent therewith, the second end portion (30c) of the same plate member (30) is caused by such downward displacement to rotate downwardly as indicated by the curved arrow relative to the pin (38). As a result thereof, a deflection is caused in the intermediate portion (30a) of strain plate member (30), in response to which, the strain gauge (32) immediately detects an amount of such deflection, determines it as a weight of the occupant on the seat (14), and emits a corresponding electric signal to a control unit (not shown).

In accordance with the load detection structure of the present invention, when an excessive great downward load in excess of the normal load (F) (i.e. the weight of a passenger) is applied to the seat (14), causing the strain plate member (30) to deflect downwardly to a level in excess of the lower limited clearance (L1), the free end of the strain plate member (30) is brought to contact with the two lower stopper pieces (52), thereby protecting the deflectable intermediate portion (30a) of strain plate member (30) against undesired deflection in excess of tolerable range in which the strain gauge (32) can work for precise detection of the deflection amount of that particular intermediate portion (30a). Conversely, if an upward excessive force is applied to the seat (14), causing the strain plate member (30) to deflect upwardly to a level in excess of the upper limited clearance (L2), then the free end of the strain plate member (30) is brought to contact with the two upper stopper pieces (54), thereby protecting the deflectable intermediate portion (30a) of strain plate member (30) against undesired deflection in excess of tolerable range in which the strain gauge (32) can work for precise detection of the deflection amount of that particular portion (30a). Therefore, such contact between the strain plate member free end and either of the lower and upper stopper pieces (52) (54) effectively protects the strain plate member (30) against damage and deformation.

From the descriptions made thus far, it is appreciated that the present invention has the following effects and advantages:

(i) The strain plate member (30) is of a relatively thin plate material and has, integrally defined therein, a hinge half portion (34) of a generally "inverted U" shaped cross-section (which may be formed in a generally U-shaped cross-section). Further, a hinge plate (42) having a hinge half portion (46) of a generally "U" shaped cross-section (which may be formed in a generally inverted-U-shaped cross-section) is fixedly connected with the strain plate member (30), whereupon a minimum required size of hinge or bearing portion, in which the hinge or pivot pin (38) is fitted, is given in the strain plate member (30). Namely, the hinge or pivot point (at 40), about which the strain plate member (30) is rotated, is effectively made small heightwise in thickness within the support leg member (26) without requiring any another thick support elements. Thus, the load detection structure can be kept thin in heightwise, thereby avoiding undesired increase in height of the seat.

(ii) Advantageously, the two securing horizontal portions (42a) of the hinge plate (42) are effective in reinforcing the hinge or pivot point of the strain plate member (30), and therefore, there is no need to provide any separate reinforcement element at that particular point.

(iii) The upper and lower stopper pieces (54) (52) are easily formed in the support leg member vertical walls (26a) by simply cutting and bending the corresponding regions therein. This requires no labor on the side of workers and no other securing element such as bolts and nuts for providing those stopper pieces in the support leg member (26). Further, the fact that both stopper pieces (54) (52) only project horizontally within the support leg member (30) means that there is no other heightwise thickness required than the thickness of the stopper pieces per se, and therefore, the height of the vertical walls (26a) of the support leg member (30) can be made as low as possible, thereby allowing the load detection structure to decrease in heightwise thickness so as to set the seat at a lowest possible level.

While having described the present invention, it should be understood that the invention is not limited to the illustrated embodiment, but any other modification, replacement and addition may be applied thereto without departing from the scopes of the appended claims. For example, the load detection structure (10) may be directly connected with the seat cushion (18) of (14) while being connected with the support leg member (26), without providing the slide rail device (16) therebetween. In addition to the two mutually faced upper stopper pieces (54) and two mutually faced lower stopper pieces (52), another two manually faced upper stopper pieces may be formed in the support leg member vertical walls (26a) at point above the first reinforcement plate (34-1) with a proper limited clearance therebetween, and another two mutually faced lower stopper pieces be formed in the vertical walls (26a) at point below the second reinforcement plate (34-2) with a proper limited clearance therebetween. The load detection structure (10) may be used for other kinds of seats for bus, truck, train, airplane and vessel.

What is claimed is:

1. A load detection structure in combination with a floor of vehicle and a vehicle seat, said load detection structure being provided under a bottom side of said vehicle seat and in a support leg means for supporting said vehicle seat upon said floor of vehicle, wherein said load detection structure includes a load detection means for detecting a load applied from an occupant on said vehicle seat, wherein said load detection means comprises:

a strain plate element having an elongated body extending in the longitudinal direction thereof, an upper flat surface, and a lower flat surface, said strain plate element having a rigid yet elastically deformable property and including, defined therein, a first end portion, a second end portion, an intermediate portion between said first and second end portions, and a hinge half portion formed transversely of and in said second end portion so as to have a half through-bore of a generally semi-circular cross-section defined therein;

a strain gauge means fixedly attached to said intermediate portion of said strain plate element;

a first reinforcement plate fixed by at least one pin on the upper flat surface of said strain plate element at a point corresponding to said first end portion;

a second reinforcement plate fixed by said at least one pin on the lower flat surface of said strain plate element at a point corresponding to said second end portion;

said at least one pin being at one end thereof fixed to said bottom side of said vehicle seat; and a hinge plate having a hinge half portion formed therein so as to have half through-bore of a generally semi-circular cross-section defined therein, said hinge plate being fixed to the second end portion of said strain plate element so that the hinge half portion of said hinge plate is aligned with the half hinge portion of said strain plate element, thereby defining a hinge through-bore of circular cross-section in between the strain plate member and the hinge plate, wherein a hinge pin is inserted in said hinge through-bore and securely provided in said support leg means, whereby said strain plate element is rotatably journalled by said hinge pin within said support leg means, and wherein, when a downward load is applied to the vehicle seat in a vertical direction, said first end portion of the strain plate element is displaced in a generally rectilinear downward direction, while at the same time, said second end portion of the strain plate element is rotated about said hinge pin, whereupon a difference is caused in movement and direction between said first and second end portions, thereby causing deflection of said intermediate portion, and, in response thereto, said strain gauge means detects an amount of said deflection and emits a corresponding value indicative of an amount of said load.

2. The load detection structure as claimed by claim 1, wherein a stopper means is provided for limiting vertical movement of said first end portion of said stain plate element, wherein said support leg means has a pair of vertical walls, wherein said stopper means comprises an upper stopper piece and a lower stopper piece, wherein said upper and lower stopper pieces are formed in each of said pair of vertical walls by cutting and bending a corresponding local area of said each of said pair of vertical walls in a direction inwardly of said support leg means, and wherein said first end portion of said strain plate element is normally positioned between said upper and lower stopper pieces, such that one limited clearance is given between said upper stopper piece and said first end portion, while another limited clearance is given between said lower stopper piece and said first end portion.

3. The load detection structure as claimed by claim 1, wherein a slide rail device is provided between said load detection means and said vehicle seat, said slide rail device comprising a lower rail and an upper rail slidably fitted in said lower rail, wherein said upper rail is fixed to said bottom side of said vehicle seat, and wherein said one end of said at least one pin is fixed to said lower rail.

4. A load detection structure in combination with a floor of vehicle and a vehicle seat, said load detection structure being provided under a bottom side of said vehicle seat and in a support leg means for supporting said vehicle seat upon said floor of vehicle, wherein said support leg means has a pair of mutually opposed vertical walls, wherein said load detection structure includes a load detection means for detecting a load applied from an occupant on said vehicle seat, wherein said load detection means comprises:

a strain plate element having an elongated body extending in the longitudinal direction thereof, an upper flat surface, and a lower flat surface, said strain plate element having a rigid yet elastically deformable property and including, defined therein, a first end portion, a second end portion, an intermediate portion between said first and second end portions, and a hinge half portion formed transversely of and in said second end portion so as to have a half through-bore of a generally semi-circular cross-section defined therein;

said strain plate element further including at least one hole formed in said first end portion;

a strain gauge means fixedly attached to said intermediate portion of said strain plate element;

a first reinforcement plate having at least one hole formed therein;

a second reinforcement plate having at least one hole formed therein;

at least one rivet pin having one end portion, another end portion, and an intermediate portion between said one and another end portions, wherein said intermediate portion is larger in diameter than said one and another end portions and said at least one hole of each of said first and second reinforcement plates;

said first and second reinforcement plates being fixedly attached to the upper and lower flat surfaces of said strain plate element, respectively, at a point corresponding to said first end portion by inserting said one end portion of said at least one rivet pin through said at least one hole of each of said first and second reinforcement plates and said at least one hole of said strain plate element, and then riveting a free end of said one end portion of said at least one rivet pin to the strain plate element;

said at least one rivet pin being also at said another end portion thereof riveted and fixedly connected to said bottom side of said vehicle seat; and a hinge plate having a half hinge portion formed therein so as to have half through-bore of a generally semi-circular cross-section defined therein, said hinge plate being fixed to the second end portion of said strain plate element so that the hinge half portion of the hinge plate is aligned with the hinge half portion of said strain plate element, thereby defining a hinge through-bore of circular cross-section in between the strain plate element and the hinge plate wherein a hinge pin is inserted in said hinge through-bore and securely provided in said support leg means, whereby said strain plate element is rotatably journalled by said hinge pin within said support leg means, and wherein, when a downward load is applied to the vehicle seat in a vertical direction, said first end portion of the strain plate element is displaced in a generally rectilinear downward direction, while at the same time, said second end portion of the strain plate element is rotated about said hinge pin, whereupon a difference is caused in movement and direction between said first and second end portion, thereby causing deflection of said intermediate portion, and, in response thereto, said strain gauge means detects an amount of said deflection and emits a corresponding value indicative of an amount of said load.

* * * * *